United States Patent [19]
Speranza et al.

[11] Patent Number: 4,503,197
[45] Date of Patent: Mar. 5, 1985

[54] WATER SOLUBLE POLYETHYLENE TEREPHTHALATE DERIVATIVES

[75] Inventors: George P. Speranza, Austin; Robert A. Grigsby, Jr., Georgetown, both of Tex.

[73] Assignee: Texaco Inc., White Plains, N.Y.

[21] Appl. No.: 592,650

[22] Filed: Mar. 23, 1984

[51] Int. Cl.$^3$ .................... C08G 63/76; C08G 63/44; C08G 69/44
[52] U.S. Cl. .................................. 525/437; 528/288; 528/292
[58] Field of Search ................. 528/288, 292; 525/437

[56] References Cited

U.S. PATENT DOCUMENTS

| | | | |
|---|---|---|---|
| 3,053,782 | 9/1962 | Shelby | 528/288 X |
| 3,928,253 | 12/1975 | Thornton et al. | 260/2.3 |
| 4,048,252 | 9/1977 | Behmel | 528/288 X |
| 4,128,525 | 12/1978 | Yeakey et al. | 260/29.1 |
| 4,167,498 | 9/1979 | Waddill | 260/18 |
| 4,290,929 | 9/1981 | McGregor et al. | 528/288 X |

OTHER PUBLICATIONS

C&E News, Jan. 5, 1981, p. 30.
Plastics Technology, Sep., 1981, (Industry/News Focus).
Technical Bulletin, "Jeffamine® Poly(oxyethylene)-diamines Jeffamine ED Compounds", Texaco Chemical Co., Copyright 1981.
Sellstrom et al., U.S. patent application Ser. No. 510,696, filed Jul. 5, 1983, "Novel Amine Curing Agents and Epoxy Resins Cured Therewith", (Coassigned).

Primary Examiner—Lucille M. Phynes
Attorney, Agent, or Firm—Jack H. Park; Kenneth R. Priem

[57] ABSTRACT

This invention relates to water soluble derivatives of polyethylene terephthalate. In another aspect, this invention relates to the conversion of solid, water insoluble polyethylene terephthalates to liquid polymeric water soluble derivatives.

6 Claims, No Drawings

WATER SOLUBLE POLYETHYLENE TEREPHTHALATE DERIVATIVES

BACKGROUND OF THE INVENTION

1. Technical Field of the Invention

This invention relates to water soluble derivatives of polyethylene terephthalate. In another aspect, this invention relates to the conversion of solid, water insoluble polyethylene terephthalates to liquid polymeric water soluble derivatives useful as water thickening agents, etc.

2. Prior Art

When terephalic acid is reacted with a diamine, the representative reaction product is a water-insoluble liquid. When terephthalic acid (normally in the form of the dimethyl ester, dimethyl terephthalate, is reacted with a glycol such as ethylene glycol, water-insoluble polymers are formed, characterized by the formula:

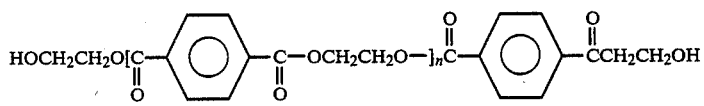

wherein n is a number having a value of about 50 to about 2,000.

It is known to react dibasic acids such as adipic acid, azealic acid, terephthalic acid, polymers of fatty acids, etc. with diamines of the formula:

$$H_2NCH_2CH_2-(HNCH_2CH_2)_xNH_2 \quad (II)$$

where x is a number having a value of 0 to 4 to form reaction products useful in the preparation of coatings and adhesives as shown, for example, by U.S. Pat. No. 4,128,525 and U.S. Pat. No. 4,167,498.

An extensive body of technical knowledge has arisen relating to the preparation of solid polyethylene terephthalate from suitable monomers such as ethylene glycol and dimethylterephthalate.

Polyethylene terephalate is widely used in the manufacture of beverage bottles and the disposal of used bottles in an environmentally acceptable manner present a major problem. One proposed solution has been to convert the used polymer into an unsaturated polyester that can be used to make moldings such as boat hulls (Plastics Technology, September 1981). The used bottles are reported to have been used as raw materials in the manufacture of industrial strappings, fiber fill for pillows, sleeping bags and the like, synthetic lumber and corrugated rubber (C&E News, Jan. 5, 1981, p. 30).

Copending coassigned Sellstrom et al. U.S. patent application Ser. No. 510,696 filed July 5, 1983 and entitled "Novel Amine Curing Agents and Epoxy Resins Cured Therewith" (D#80,060) discloses oil soluble, essentially water insoluble compositions useful in the curing of epoxy resins prepared by dissolving polyethyleneterephthalate in an amine curing agent, such as an amine having formula (III), below:

$$NH_2-CH(CH_3)-CH_2[O-CH_2CH(CH_3)]_xNH_2 \quad (III)$$

wherein x has a value of 2 to 40.

SUMMARY OF THE INVENTION

In accordance with the present invention polyethylene terephthalates of formula I above are converted to liquid water-soluble polymeric materials by reaction with a diamine of the formula:

wherein a+c equals 2 to 10 b is a number having a value of about 1 to about 50.

The polyethylene terephthalate is suitably a solid polymer that has already served its primary purpose as a bottle, a film, etc. In this fashion, environmentally objectionable polyethylene terephthalates can be converted from essentially inert water insoluble materials into water soluble products useful, for example, in the manufacture of adhesives.

The products of the present invention are easily prepared by shredding the polymer and adding it to the amine with agitation, at a temperature of about 200° to about 280° C., and more preferably from about 200° C. to abut 250° C. The reaction is preferably conducted in a reaction vessel equipped with agitation and heating means and is preferably conducted in an inert atmosphere such as nitrogen, carbon dioxide, etc. The reaction is not particularly sensitive to pressure and may be conducted at sub-atmospheric or superatmospheric pressures, if desired, but is preferably conducted at atmospheric pressure. It is preferable to use a molar excess of the amine.

An advantage of the present invention is that polyethylene terephthalates prepared for another purpose (bottles, films, etc.) can be used as starting materials in that fillers, dyes, pigments, stabilizers, etc. will not adversely affect the reaction. However, many of these materials are insoluble in the reaction product and, therefore, may be removed, if desired, by any appropriate means such as filtration, centrifugation, etc. at the end of the reaction.

The reaction is normally complete within about 2 to 10 hours, but extended reaction times can be used without adverse effect.

SPECIFIC EXAMPLES

EXAMPLE 1

Jeffamine ED-600 is a product having the formula:

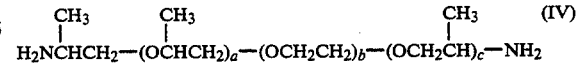

where the approximate value of b is about 13.5 and the approximate value of a+c is about 3.5. A mixture of Jeffamine ED-600 (0.2 mole, 120.0 grams) and green-dyed shredded polyethylene terephthalate chips (0.13 mole, 25.9 grams) were added to a nitrogen flushed reaction vessel. The reactants were heated to 220° C. and held at 220° C. for three hours. A mechanical stirrer was used to provide agitation during the heating period. The light green solution (from the green dye) was cooled to 150° C. and filtered to remove unreacted polyethylene terephthalate and other solids present in the polyethylene terephthalate chips. Upon cooling to room temperature, the product was a clear, water soluble, light green fluid liquid which would flow easily at room temperature.

Analysis of the green product by titration yielded an amine equivalent of 1.06 meq/g and total acetylatables of 2.19 meq/gram.

The yield of the product was 144.5 grams or 99.0%.

EXAMPLES 2-5

Examples 2-5 were completed in the same manner as Example 1. These examples are listed in Table 1 along with their experimental conditions and results.

TABLE 1

Reactions of Jeffamine ED-600 Amines with Polyethylene Terephthalates

|  | 2 5757-01 | 3 5757-08 | 4 5757-59 | 5 5757-62 |
|---|---|---|---|---|
| moles of ED-600 | 1.40 | 1.50 | 0.20 | 0.20 |
| Grams of ED-600 | 840.0 | 840.0 | 120.0 | 120.0 |
| Percent of ED-600 | 86.1 | 86.1 | 82.2 | 75.8 |
| moles of PET[1] | 0.70 | 0.70 | 0.13 | 0.20 |
| Grams of PET | 135.8 | 135.8 | 25.9 | 38.4 |
| Percentage of PET | 13.9 | 13.9 | 17.8 | 24.2 |
| Temperature of reactions | 220 | 220 | 220 | 220 |
| Time of reactions (hrs) | 54 | 4 | 3 | 3 |
| Total acetylatables | 1.50 | 2.14 | 1.72 | 1.12 |
| Amine equivalent | 1.11 | 1.50 | 1.01 | 0.48 |
| Color | Brown | Green | Green | Green |
| Yield (%) | — | — | 98.4 | 94.0 |

[1]PET is polyethylene terephthalate

EXAMPLE 6

Jeffamine ED-900 is a product having the formula:

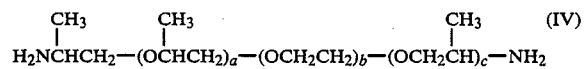

$$H_2NCHCH_2-(OCHCH_2)_a-(OCH_2CH_2)_b-(OCH_2CH)_c-NH_2 \quad (IV)$$

with CH$_3$ groups on the indicated carbons, wherein the approximate value of b is about 20.5 and the approximate value of a+c is about 3.5. A mixture of Jeffamine ED-900 (0.14 mole, 126.0 grams) and green-dyed polyethylene terephthalate chips (0.13 mole, 24.6 grams) were added to a nitrogen flushed reaction vessel. The reactants were heated to 220° C. and held at 220° C. for three hours. After three hours, the temperature of the reaction mixture was increased to 240° C. and held at 240° C. for 1½ hours. A mechanical stirrer was used to provide agitation during the heating period. The light green solution was then cooled to 150° C. and filtered to remove polyethylene terephthalate and other solids present in the polyethylene terephthalate chips. Upon cooling to room temperature, the product was a clear, water soluble, light green fluid liquid which would flow at room temperature.

Analysis of the green product by titration yielded an amine equivalent of 0.42 meq/gram and a total acetylatables of 1.21 meq/gram.

The yield of the product was 148.6 grams or 98.7%.

EXAMPLES 7-10

Examples 7-10 were completed in the same manner as Example 6. These examples are listed in Table 2 along with their experimental conditions and results.

TABLE 2

|  | 7 5690-80 | 8 5690-89 | 9 5690-56 | 10 5757-60 |
|---|---|---|---|---|
| moles of ED-900 | 0.14 | 0.77 | 0.14 | 0.90 |
| Grams of ED-900 | 126.0 | 693.0 | 126.0 | 810.0 |
| Percent of ED-900 | 76.8 | 83.7 | 90.4 | 90.4 |
| moles of PET[1] | 0.20 | 0.70 | 0.07 | 0.45 |
| Grams of PET | 38.0 | 135.3 | 13.4 | 86.4 |
| Percentage of PET | 23.2 | 16.3 | 9.60 | 9.60 |
| Temperature of reactions | 220-240 | 220-240 | 230 | 220 |
| Time of reactions (hrs) | 3 | 3 | 3 | 3 |
| Total acetylatables | 1.12 | 1.05 | 1.43 | 1.55 |
| Amine equivalent | 0.20 | 0.43 | 1.04 | 1.07 |
| Color | Green | Brownish green | Green | Green |
| Yield (%) | 98.5 | 98.4 | 98.4 | 95.9 |

[1]PET is polyethylene terephthalate

EXAMPLE 11

Jeffamine ED-2001 is a product having the formula:

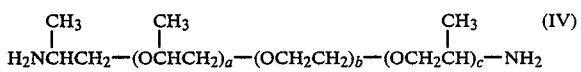

$$H_2NCHCH_2-(OCHCH_2)_a-(OCH_2CH_2)_b-(OCH_2CH)_c-NH_2 \quad (IV)$$

wherein the approximate value of b is about 45.5 and the approximate value of a+c is about 3.5. A mixture of Jeffamine ED-2001 (0.06 mole, 120.0 grams) and brown dyed polyethylene terephthalate chips (0.06 mole, 10.6 grams) were added to a nitrogen flushed reaction vessel. The reactants were heated to 220° C. and held at 220° C. for three hours. After three hours, the temperature of the reaction was increased to 240° C. and held at 240° C. for 1.5 hours. A mechanical stirrer was used to provide agitation during the heating period. The light brown solution is then cooled to room temperature. A light brown, water soluble, waxy solid was formed on cooling.

Analysis of the product by titration yielded an amine equivalent of 0.24 meq/gram and a total acetylatables of 0.04 meq/gram.

The yield of the product was 126.1 grams or 96.6%.
The melting point of the solid was 45° C.

EXAMPLES 12-14

Examples 12-14 were completed in the same manner as Example 11. These examples are listed in Table 3 along with their experimental conditions and results.

TABLE 3

|  | 12 5690-79 | 13 5690-86 | 14 5757-63 |
|---|---|---|---|
| moles of ED-2001 | 0.06 | 0.05 | 0.06 |
| Grams of ED-2001 | 120.0 | 100.1 | 120.0 |
| Percent of ED-2001 | 85.7 | 91.2 | 95.6 |
| moles of PET[1] | 0.10 | 0.05 | 0.029 |
| Grams of PET | 20.0 | 9.7 | 5.50 |
| Percentage of PET | 14.3 | 8.8 | 4.4 |
| Temperature of reactions | 220-240 | 220-230 | 220-230 |
| Time of reactions (hrs) | 4.5 | 4.4 | 4 |
| Total acetylatables | 0.58 | 0.90 | 1.03 |
| Amine equivalent | 0.20 | 0.69 | 0.75 |
| Color | Brown | Grey | Brown |
| Yield (%) | 98.0 | 98.2 | 96.4 |
| Melting point (°C.) | 43-44 | 46-48 | 46-47 |

[1]PET is polyethylene terephthalate

EXAMPLE 15

A mixture of Jeffamine ED-900 amine (0.15 mole, 135.0 grams), brown dyed polyethylene terephthalate chips (0.071 mole, 13.7 grams), and Monsanto's acid (0.071 moles, 9.43 grams; a by-product mixture of succinic acid, glutaric acid and adipic acid obtained from the synthesis of adipic acid) were added to a nitrogen flushed reaction vessel. The reactants were heated to 200° C. for three hours and then to 240° C. for three hours. A mechanical stirrer was used to provide agitation during the heating period. The brown solution was cooled to 200° C. and filtered to remove unreacted polyethylene terephthalate and other solids present in the polyethylene terephthalate chips. Upon cooling to room temperature a brown, thick, water soluble, liquid was formed which would flow at room temperature.

Analysis of the brown product by titration yielded an amine equivalent of 0.42 meq/gram and a total acetylatables of 0.52 meq/gram.

The yield of the product was 147.9 grams or 95.0%.

EXAMPLE 16

Example 16 was completed in the same manner as Example 15 except Jeffamine ED-600 amine (0.15 mole, 90.0 grams) was used.

Analysis of the brown, thick, water soluble, liquid by titration yielded an amine equivalent of 0.41 and a total acetylatables of 0.48.

The yield of the product was 106.1 grams or 96.0%.

EXAMPLE 17

A mixture of Jeffamine ED-600 (6.0 moles, 3600 g) and polyethylene terephthalate (3.0 moles, 5.76 g) is added to a 5 L nitrogen flushed reaction vessel. The reactants are heated to 240° C. for 3 hours. During this time 70.2 g of overhead distilled over. The reaction vessel was cooled to 180° C. and a 1.0 mm Hg vacuum is applied to the reaction vessel. The reactants were heated to 220° C. under vacuum for 5 hours during which an additional 75.1 of overhead was collected. Upon cooling to room temperature, a water soluble, blue, free flowing liquid product is obtained.

Analysis of the product by titration yielded an amine equivalent of 1.34 meg/gram and a total acetylatables of 1.66 meg/gram. The yield of product was 4011.2 g.

EXAMPLE 18

Example 17 was repeated except that Jeffamine ED-900 (3600 g, 4.0 mole) and polyethylene terephthalate (2.0 mole, 384 g) was used. Analysis of the green, slightly viscous, water soluble liquid by titration yielded an amine equivalent of 0.92 meg/gram and a total acetylatables of 0.99 meg/gram.

The yield of the product was 3845.3 g.

By way of summary, in accordance with the present invention, water soluble products are formed which can be characterized by the following formula:

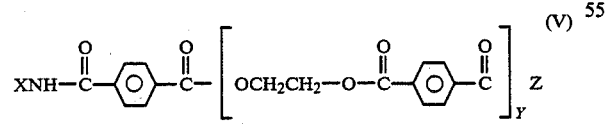
(V)

where X represents:

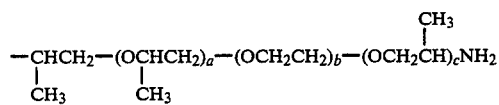

z represents NHX or —OCH$_2$CH$_2$OH, y is a number between 0 and about 4, a+c equal about 2 to 10, and b is a number having a value of about 1 to about 50.

RELATED COPENDING APPLICATION

Copending coassigned Peterson et al. U.S. patent application Ser. No. 06/592,653 filed Mar. 23, 1984 (of an even date herewith) and entitled "Manufacture of Flexible Polyurethane Foam Containing a Condensation Product of Polyethyleneterephthalate" discloses the use of the water soluble amine derivative of the present invention, including the derivatives of Example 1 and Example 6 in the manufacture of flexible polyurethane foam.

It will be understood that the foregoing examples are given by way of illustration only and not by way of limitation and that the scope of the present invention is defined solely by the appended claims.

What is claimed is:

1. A method for the preparation of a water-soluble amine derivative of a polyethylene terephthalate which comprises adding particulate polyethylene terephthalate to an amine in an inert atmosphere with agitation at a temperature of about 150° C. to 250° C. and maintaining said temperature for at least about 2 hours, said amine having the formula:

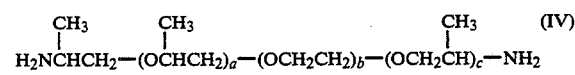
(IV)

wherein a+c is about 2 to 10 and b is about 1 to 50, said water-soluble amine derivative having the formula:

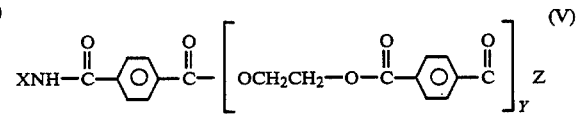
(V)

where X represents:

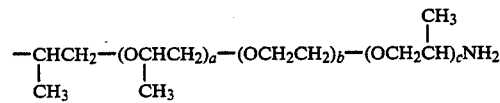

z represents NHX or —OCH$_2$CH$_2$OH, y is a number between 0 and about 4, b is a number having a value of about 1 to about 50.

2. A method as in claim 1 wherein the temperature is in the range of about 200° C. to about 230° C. and is maintained for about 3 to 5 hours.

3. A method as in claim 2 wherein a+c equals 3.5 and b equals 13.5.

4. A method as in claim 2 wherein a+c equals 3.5 and b equals 20.5.

5. A method as in claim 2 wherein a+c equals 3.5 and b equals 45.5.

6. A water soluble derivative of polyethylene terephthalate having the formula:

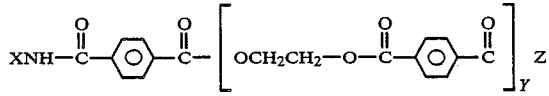
where X represents:
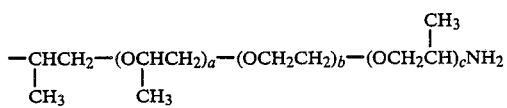
z represents NHX or —OCH₂CH₂OH,
y is a number between 0 and about 4,
a+c equal about 2 to 10, and
b is a number having a value of about 1 to about 50.
* * * * *